Aug. 14, 1951     H. WATERSTONE     2,564,553
AUTOMATIC STOPPING AND TIME DELAY FOR MIXER MOTORS
Filed April 4, 1949     3 Sheets-Sheet 1
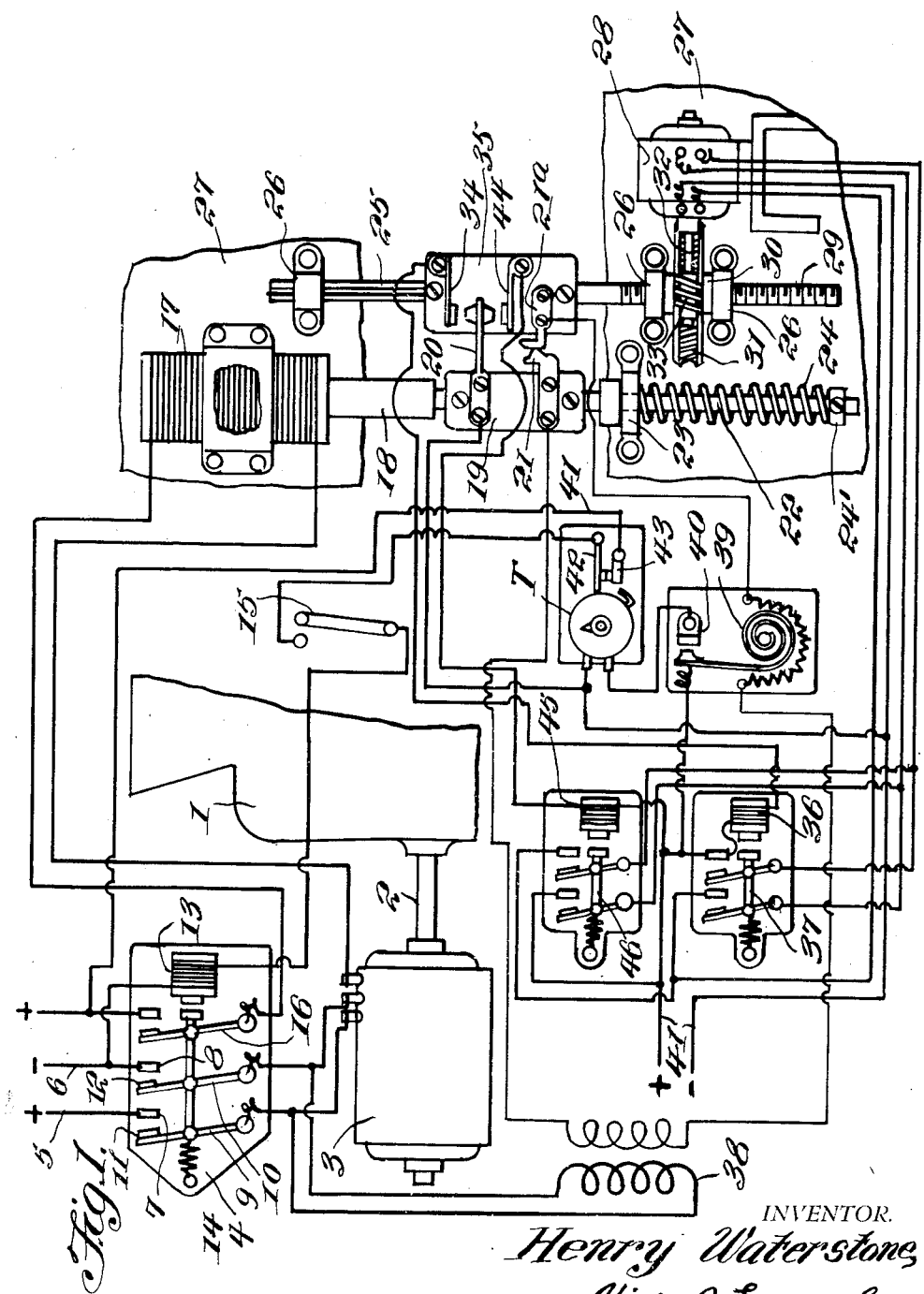
INVENTOR.
Henry Waterstone,
BY Victor J. Evans & Co.
ATTORNEYS Aug. 14, 1951     H. WATERSTONE     2,564,553
AUTOMATIC STOPPING AND TIME DELAY FOR MIXER MOTORS
Filed April 4, 1949                                3 Sheets-Sheet 2
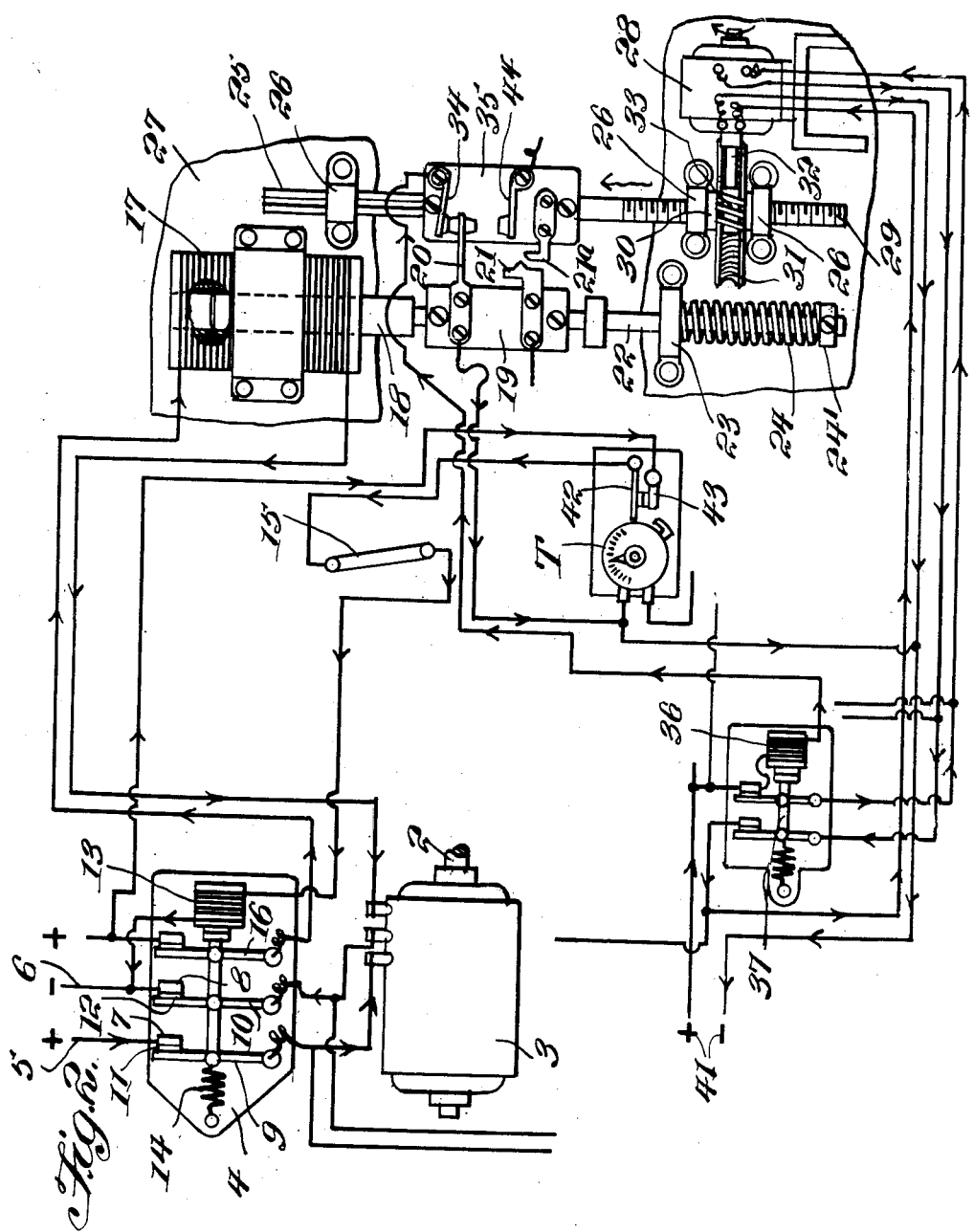
INVENTOR.
Henry Waterstone,
BY Victor J. Evans & Co.
ATTORNEYS Aug. 14, 1951     H. WATERSTONE     2,564,553
AUTOMATIC STOPPING AND TIME DELAY FOR MIXER MOTORS
Filed April 4, 1949     3 Sheets-Sheet 3
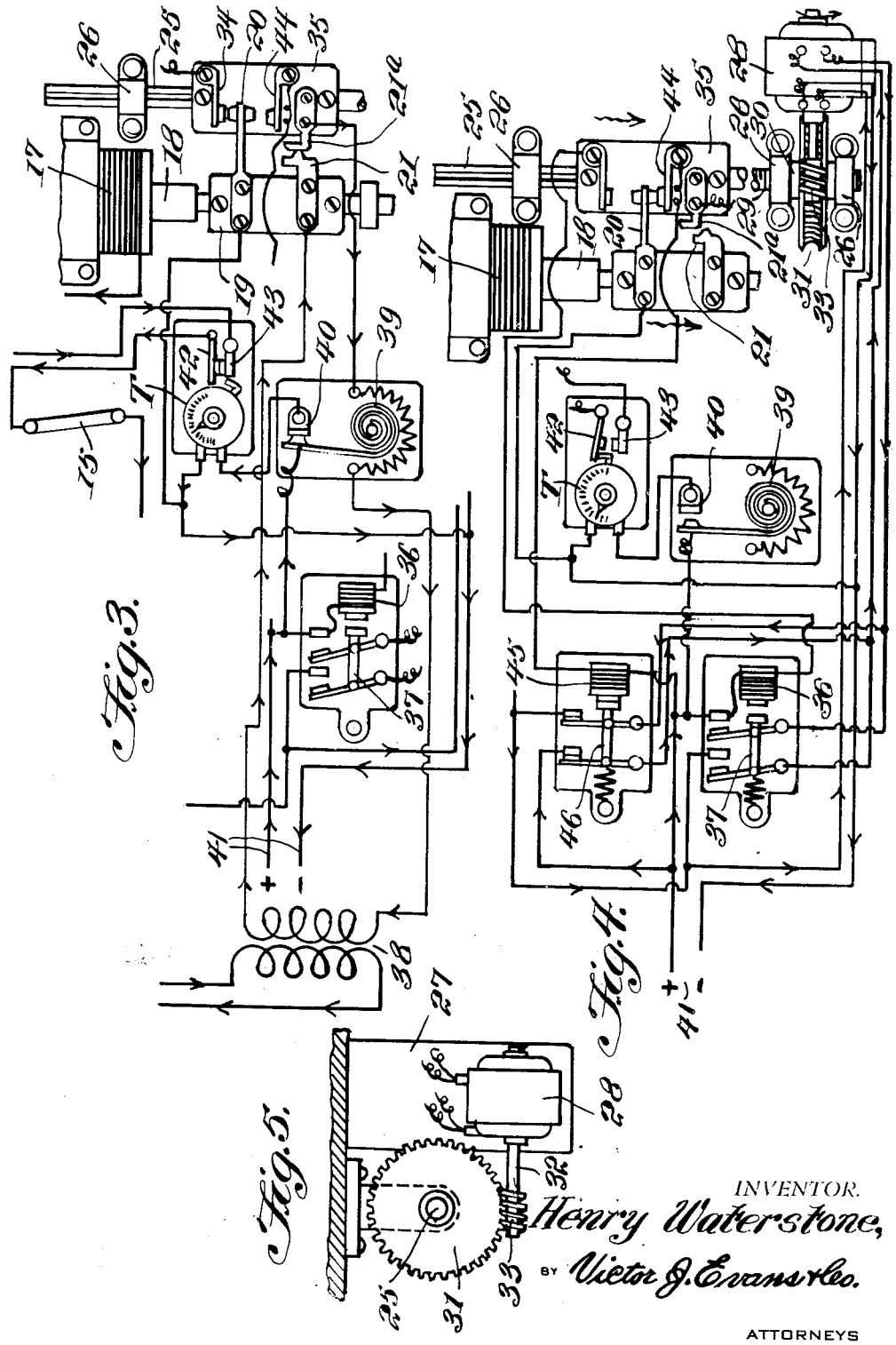
INVENTOR.
Henry Waterstone,
BY Victor J. Evans & Co.
ATTORNEYS Patented Aug. 14, 1951

2,564,553

UNITED STATES PATENT OFFICE 2,564,553

AUTOMATIC STOPPING AND TIME DELAY FOR MIXER MOTORS

Henry Waterstone, Angola, Ind.

Application April 4, 1949, Serial No. 85,436

3 Claims. (Cl. 318—476)

The present invention relates to rotary dough mixers in the general class of bread and pastry making, and more specifically to an improved electrical control for dough mixers employed in combination with the dough-mixing motor for automatically controlling, governing, and regulating the electrical motor which operates the mixer.

In usual practice, the load on the mixer gradually increases as the mixing process progresses, and the amperage supplied to the motor for operating the mixer also is gradually increased until a stage is reached when the dough is removed from the walls of the mixing tank or bowl and the dough is carried by the revolving blades or dashers of the mixer; and this stage is called the clearing time.

For a cycle in the process following the clearing time the automatic electrical control is employed to govern the operation of the motor and the mixer until the mixing operation is completed and the mixer is stopped.

During this stage or cycle of the mixing process the motor and the mixer may be set and timed to operate for a predetermined period during which the control mechanism governs and regulates the amperage supplied to the electrical motor of the mixer in accord with any varying load or loads that may be imposed on the mixer.

The equipment of the electrical control mechanism includes a minimum number of parts that may be manufactured with facility and low cost of production, and the parts may be assembled with convenience and installed for coaction with the rotary mixer to insure a reliable and durable mechanism that is accurate and efficient in the performance of its functions.

The invention consists in certain novel features of construction and combinations and arrangements of parts as will hereinafter be described, and more particularly set forth in the appended claims.

In the accompanying drawings I have illustrated a complete physical embodiment of my invention in which the parts are combined and arranged in accord with one mode I have devised for the practical application of the principles of the invention. It will however be understood that changes and alterations are contemplated and may be made in these exemplifying drawings and structures, within the scope of my claims without departing from the principles of the invention.

Figure 1 is a plan view showing a portion of a dough mixer and the mixer-motor, together with the electrical appliances and wiring, with the electrical power cut off and the governor in neutral position.

Figure 2 is a diagrammatic view with the operating circuit closed, the timing mechanism set, and the governor acting to increase the speed.

Figure 3 is a diagrammatic view similar to Fig. 1 with governor set for a uniform power and speed of operation.

Figure 4 is a diagram of the wiring and appliances with governor motor operating in reverse to restore the governor to initial position after a cycle of operation; and Figure 5 is a detail view of the motor and gearing for the electromechanical governor of the control system.

In order that the general relation and utility of parts may readily be understood, Fig. 1 discloses a fragment of a conventional rotary dough mixer, as 1, having multiple rotary arms or dashers, and the mixer is operated through the shaft 2 of an electrical motor 3, installed and supported in desired position for use. The operation of the mixer motor is controlled by means of a multi-pole switch mounted upon a switch board 4, and the power lines 5 and 6, having a voltage of approximately two hundred and twenty volts, are attached to terminals 7 and 8. The multi-pole automatic control switch includes two switch arms 9 and 10 provided with movable contacts 11 and 12 respectively for coaction with the fixed contacts 7 and 8, and these arms are controlled by a relay 13 of the electrical system. When energized, the relay automatically closes the motor control switch, and when the relay is de-energized, the switch is automatically opened by means of a spring 14 anchored to the switch board or plate and attached to the multipole switch.

A conventional timing mechanism, or timer T is employed and manually set for controlling the operating cycle of the mixer for a predetermined period of time, and a manually operated switch 15, that is connected with the relay 13 is closed to make the motor circuit and start the control mechanism; and this switch is opened to release the relay and to cut out the motor, when the latter is idle.

A third switch arm 16 of the multiple pole automatic switch controls an electromechanical governor or regulator for the motor 3, and this switch circuit is connected with an electromagnet 17 suitably mounted upon a base or frame 27 and equipped with a reciprocating armature or core bar 18.

The reciprocable core is equipped with an insulating or fiber plate 19 forming a carrier for two spaced and movable contacts 20 and 21, and beyond the carrier the core bar has an axially alined extension rod 22, slidably mounted in bearings, as 23, fastened to the base or frame 27. The core bar, under influence of electrical energy is drawn upwardly when the electromagnet is energized and the switch 4 closed, and a spring 24 is coiled about the bar and interposed between bearing 23 and a fixed washer 24' on the end of the bar. When the electromagnet is energized the core bar is pulled in against the resilience of the spring, and when the electromagnet is de-energized the compressed spring retracts the core to open position and resiliently holds the core.

The mechanical part of the electromechanical governor includes a longitudinally reciprocable and non-rotary traveling bar 25 that is mounted in bearings 26 on base 27, and this adjusting bar is reciprocated by power from a reversible auxiliary electric motor 28 included in the electrical system. The lower portion 29 of the reciprocable bar is threaded through an internally threaded collar or rotary bushing 30 that forms a non-traveling rotary nut for actuating the screw bar, and the nut forms a hub rigid with a gear wheel 31 rotated from the shaft 32 of the motor 28 through the worm gear 33 rotatable with the motor shaft.

As indicated in Fig. 2 the auxiliary motor 28 is activated when the electromagnet 17 is energized to engage its movable contact 20 with a complementary contact 34 which is mounted on an insulated carrier 35 fixed in adjusted position on the screw bar 25 that is arranged in parallelism with the core of the electromagnet. From these contacts 20—34 a forward motor control circuit is closed through a relay 36 that closes a double pole switch 37 to complete the circuit and operate the motor 28, which in turn transmits power for reciprocating the screw bar. Thus the motor 28 operates to elevate the screw bar until its contact 34 is disengaged from the relatively stationary contact 20 of the core bar; and simultaneously, as indicated in Fig. 1, a contact 21a moving with the screw bar, engages the contact 21 of the core bar, and the motor 28 continues to run without change in its load.

As the mixing of the dough progresses, and should the load on the motor 3 increase due to heavier work required by the mixer, an increased supply of current is furnished from the operating circuit of the mixer-motor, through the electromagnet of the governor, and the magnet again lifts contact 20 into engagement with contact 34; and these contacts remain closed until the motor 28 and its transmission mechanism move the core to separate the contacts 20—34 and again close the retaining contacts 21—21a.

When the dough mixture attains a consistency that requires no further changes in the operating circuit, the electromagnet of the governor is stabilized by electrical energy and the spring 24 in its position, and the screw bar remains stationary with its contacts 21—21a closed, as in Fig. 3, and electrical energy will flow from a six-volt supply transformer 38 through a heat coil or thermostat 39 that closes the circuit maker 40 to receive supplemental energy from an independent supply 41 though contacts 42 and 43 of the timer T.

At the conclusion of the period or cycle for which the timer has been set, its mechanism will open the switch 42—43, thereby causing solenoid 13 to be de-energized, whereupon spring 14 opens the bi-polar switch 9—10 to stop the motor 3 as well as the motor 28.

In Fig. 4, for a reverse movement of the motor 28 and restoration of the mechanical portion of the electromechanical governor to initial position for another cycle, the spring 24 of the core bar pulls down the core bar and contact 20 carried thereby until contact 20 frictionally engages the relatively stationary contact 44 mounted on the carrier 35 of the screw bar, and from this closed circuit maker current flows through a reversing circuit to a second relay 45 for the motor 28 that closes a bi-polar switch 46 to complete the circuit for reversing the operation of the motor 28.

It will be understood, therefore, that closing of the switch 15, which may be actuated by a starting button causes the circuit to start the mixing motor 3 and under ordinary conditions the mixer contniues to operate, however, should undue strain be placed upon the motor to overload the same the increased current required to actuate the motor raises the core 18 of the solenoid 17 whereby the contacts 20 and 44 are separated and the circuit to the motor 3 is broken.

Should the motor continue to operate under normal conditions the operation of the machine continues until the timer opens the contacts 42 and 43 to stop the operation.

In starting the machine the timer is set to the required mixing time which permits the contacts 42 and 43 to close and the switch 15 is actuated by a starting button which through the relay 13 closes the switch 4, starting the main motor 3. Upon completion of the circuit to the motor 3 a circuit is completed through the solenoid 17 which raises the core 18 with the fibre plate 19, closing contacts 20 and 34 which complete a circuit through the switch 46 to the motor 28. The worm gear actuated by the motor 28 moves the bar 25 upwardly opening the contacts 20 and 34 and closing the contacts 20 and 44. The parts will remain in these positions under normal load and the operation of the mixer will continue until a shock load, resulting from an accident, or the like is placed upon the motor 3.

Should the motor load be increased the additional current supply required raises the core 18 further again placing the contacts 20 and 34 together and starting the motor 28 which closes the contacts 21 and 21a.

With the contacts 21 and 21a closed current is supplied from the low voltage side of the transformer 38 to the thermostat 39 which closes the contacts 21 and 21a whereby current will be supplied from an independent supply to the timer and the timer will open the contacts 42 and 43 thereby breaking the circuit tot he motor 3. With the circuit broken the core 18 drops whereby contact 20 makes a contact with the contact 44 reversing the motor 28 and thereby lowering the rod 25.

With this movement the parts are returned to the starting position and in starting the timer is actuated to close the conacts 42 and 43 and also set to open 'the contacts after a predetermined time.

Having thus fully described my invention, what I claim as new and desire to secure by Letters Patent is:

1. In a motor control, the combination which comprises a motor, a switch through which current is supplied to the motor, a solenoid having a core connected in the circuit of the motor, a switch arm extended from the core of the solenoid, a pair of contacts mounted in spaced relation on opposite sides of the said switch arm and positioned whereby energization of the solenoid actuates the core to close the switch arm with one of the contacts of the said pair, a reversible motor, means actuating the reversible motor upon closing of the said switch arm and contact, means actuating the said pair of contacts by the reversible motor whereby the contact of the pair and switch arm are separated and wherein the other contact of the pair is engaged with the said switch arm to complete an operating circuit to the motor having the switch associated therewith, and means whereby accidental overload on the motor sends additional current through the solenoid further raising the said core and again separating the contacts to break the circuit to the elements.

2. In a motor control, the combination which comprises a motor, a switch through which current is supplied to the motor, a solenoid having a core connected in the circuit of the motor, a switch arm extended from the core of the solenoid, a pair of contacts mounted in spaced relation on opposite sides of the said switch arm and positioned whereby energization of the solenoid actuates the core to close the switch arm with one of the contacts of the said pair, a reversible motor, means actuating the reversible motor upon closing of the said switch arm and contact, means actuating the said pair of contacts by the reversible motor whereby the contact of the pair and switch arm are separated and wherein the other contact of the pair is engaged with the said switch arm to complete an operating circuit to the motor having the switch associated therewith, means whereby accidental overload on the motor sends additional current through the solenoid further raising the said core and again separating the contacts to break the circuit to the elements, and a timer in the circuit to the motor for breaking the said circuit after a predetermined period of time.

3. In a motor control, the combination which comprises a motor, a switch through which current is supplied to the motor, a solenoid having a core connected in the circuit of the motor, a switch arm extended from the core of the solenoid, a pair of contacts mounted in spaced relation on opposite sides of the said switch arm and positioned whereby energization of the solenoid actuates the core to close the switch arm with one of the contacts of the said pair, a reversible motor, means actuating the reversible motor upon closing of the said switch arm and contact, means actuating the said pair of contacts by the reversible motor whereby the contact of the pair and switch arm are separated and wherein the other contact of the pair is engaged with the said switch arm to complete an operating circuit to the motor having the switch associated therewith, means whereby accidental overload on the motor sends additional current through the solenoid further raising the said core and again separating the contacts to break the circuit to the elements, and a timer having a thermostatically controlled switch in combination therewith for opening the circuit to the motor after a predetermined period of time.

HENRY WATERSTONE.

REFERENCES CITED

The following references are of record in the file of this patent:

UNITED STATES PATENTS

| Number | Name | Date |
| --- | --- | --- |
| 2,376,142 | Hoffman et al. | May 15, 1945 |